Patented Feb. 20, 1923.

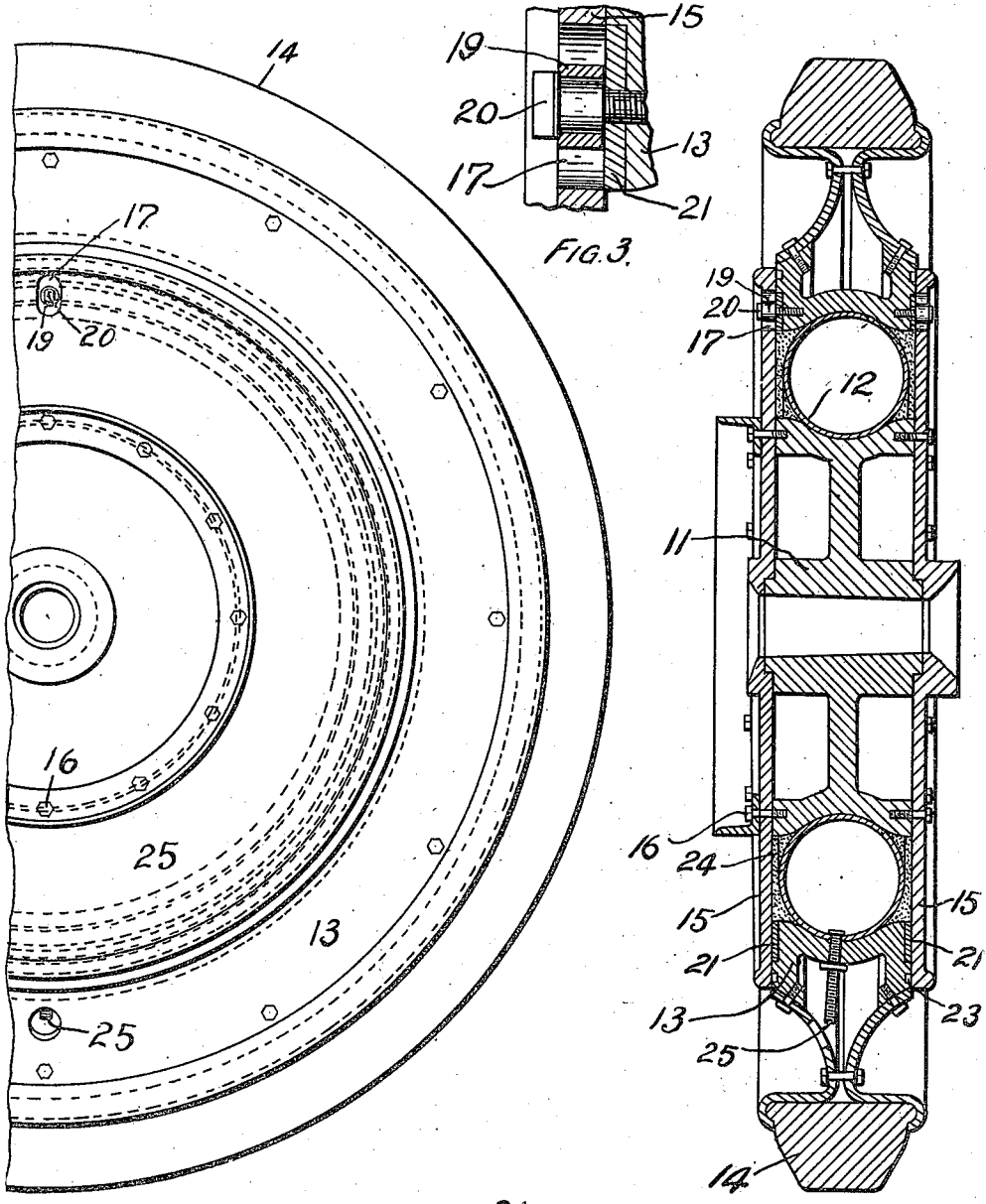

1,446,146

UNITED STATES PATENT OFFICE.

ROMÉO ARSENAULT, MARTIN PHILLIPS, AND LOUIS DUCHESNEAU, OF CAP DE LA MADELEINE, QUEBEC, CANADA.

AUTOMOBILE WHEEL.

Application filed June 5, 1922. Serial No. 565,963.

*To all whom it may concern:*

Be it known that we, ROMÉO ARSENAULT, MARTIN PHILLIPS, and LOUIS DUCHESNEAU, all subjects of the King of Great Britain, and residents of Cap de la Madeleine, in the Province of Quebec and Dominion of Canada, have invented certain new and useful Improvements in Automobile Wheels, of which the following is a full, clear, and exact description.

This invention relates to pneumatic cushioned wheels and the object of the invention is to provide a more resilient wheel.

A second object is to provide a wheel in which the pneumatic tire is protected from punctures, blow outs and the like, by being kept clear of contact with the road and from the elements of the weather.

A further object is to eliminate skidding by providing the back wheels with solid rubber tires with a flat surface. Solid round tires are used only on the front wheels to facilitate steering.

In our invention we provide an automobile wheel where the pneumatic tire is protected by being enclosed in an all metal casing. This casing is provided by building a hub, an outer rim on which is mounted the outer solid tire, and two encasing plates or cover plates. The pneumatic tire or pneumatic cushion is thus protected from injury due to exposure or from coming in contact with sharp objects in the path of the wheel.

We also provide the wheel with a tire with flat tread for back wheels and a tire with round tread for the front wheels, the former construction to prevent skidding and the like, and the latter for facilitating the steering. The cover plates are fixed to the hub and the outer rim is driven through the medium of a roller mounted on a hardened steel pin screwed into the rim of the wheel, the roller working within a slot cut in the cover plates. This slot allows the pin to take up any variation in its position due to deflation of the pneumatic tire. The rim is allowed to slide in the cover plates and the pins and rollers are the medium for driving the outer rim. We also provide well lubricated brass wearing rings to eliminate the friction due to the cushioning between the hub and the outer rim.

In the accompanying drawing:

Figure 1 is a side elevation of the wheel showing the general appearance and construction.

Figure 2 is a sectional elevation of the wheel showing the construction in detail.

Figure 3 is a view of the driving element or torque transmitter between the hub and the rim of the wheel.

Figure 4 is a part elevation of the brass wearing ring showing the means of lubrication.

In the drawings, 11 designates the centre or the hub of the wheel which is mounted on the axle of an automobile and bored to accommodate the same. The outer periphery of the hub is recessed to accommodate a pneumatic tire 12. The outer rim 13 is bored to accommodate the outside diameter of the pneumatic tire 12 and is fitted with a flat solid tire 14. The pneumatic tire 12 acts as a cushion between the hub 11 and the rim 13. Two cover plates 15 are fitted to the hub 11 and held in position by the screws 16. The cover plates 15 are centred on the boss of the hub 11 and of large enough diameter to form a guide for the rim 13. A casing is thus formed between the hub 11, the rim 13 and the cover plates 15, for the pneumatic tire 12. A driving element is provided between the hub and the outer rim through the medium of the cover plates 15. Slots 17 are cut in the cover plates 15 the sides of which engage rollers 19. The pins 20 screwed into the rim 13 support the rollers 19. The slot 17 allows the rollers to accommodate themselves to any position required caused through the deflation or expansion of the tire 12. The rollers 19 and the pins 20 are used as a driving medium or torque transmitter between the hub and rim. To prevent undue wear and also to eliminate friction between cover plates 15 and the rim 13 we provide friction rings 21 countersunk into the rim 13. These plates are provided with holes 22 which are filled with a good lubricant composition to eliminate friction between the rubbing surfaces. To prevent leakage of the lubricant, packing rings 23 are provided, a recess being provided in the rim for said packing. Soapstone 24 is placed around the tire 12, and between it and the parts of the wheel coming in contact with it to reduce friction and wear of said tire 12. To inflate the tire the valve 25 is provided. In the drawing, Figure 2 shows a back or driving wheel which is bored and keywayed to suit the driving axle and it will be noted it is fitted with a flat solid tire to prevent skidding. The front wheel can be fitted with a solid rubber tire of semicircular section and its hub can be bored to accommodate ball or roller bearings as required. The torque transmitter or driving element can be fitted to back wheels or driving wheels only. The rim 13 comprises an inner casting and two circular pressed rings bolted to said casting. The outer edges of the rim are formed to clamp solid rubber tire 14 as shown in accompanying drawing.

Having thus described our invention, what we claim is;—

1. A wheel structure comprising a hub, a tire carrying rim surrounding the hub, a resilient cushion interposed between the hub and said rim, side plates secured to the hub and extending upon opposite sides of the rim, pins carried by the rim disposed for radial movement in elongated slots formed in the said plates and rollers carried by the pins for engaging the walls of the slots.

2. A wheel structure as recited in claim 1 in which the roller carrying pins are threaded into the rim so as to be removable therefrom.

3. A wheel structure as recited in claim 1 including friction rings secured to opposite sides of the rim by means of said pins and rollers, and adapted for engagement with said plates.

4. A pneumatic tire comprising a hub, side plates secured to the hub and projecting beyond the periphery of the same, a tire carrying rim fitting between said plates, means establishing a drive connection between the hub and rim, a pneumatic tube interposed between the rim and hub and a filling of soapstone interposed between the said tube and the side plates to reduce wear and friction between these parts.

In witness whereof, we have hereunto set our hands.

ROMÉO ARSENAULT.
MARTIN PHILLIPS.
LOUIS DUCHESNEAU.